US006661786B1

(12) United States Patent
Abbiate et al.

(10) Patent No.: US 6,661,786 B1
(45) Date of Patent: Dec. 9, 2003

(54) SERVICE MESSAGE SYSTEM FOR A SWITCHING ARCHITECTURE

(75) Inventors: Jean-Claude Abbiate, La Gaude (FR); Alain Blanc, Tourrettes sur Loup (FR); Bernard Brezzo, Nice (FR); Sylvie Gohl, La Colle sur Loup (FR); Michel Poret, Gattieres (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/315,446

(22) Filed: May 20, 1999

(30) Foreign Application Priority Data

Aug. 28, 1998 (EP) .............................................. 98480057

(51) Int. Cl.[7] .............................................. H04L 12/50
(52) U.S. Cl. ........................ 370/386; 370/219; 370/220
(58) Field of Search ................................ 370/217, 218, 370/219, 220, 221, 222, 223, 224, 470, 471, 386, 389, 395.1

(56) References Cited

U.S. PATENT DOCUMENTS

| | | | | |
|---|---|---|---|---|
| 5,325,358 A | * | 6/1994 | Goeldner | 370/60 |
| 5,436,886 A | * | 7/1995 | McGill | 370/16 |
| 5,844,887 A | * | 12/1998 | Oren et al. | 370/218 |
| 6,049,542 A | * | 4/2000 | Prasad | 370/386 |
| 6,259,693 B1 | * | 7/2001 | Ganmukhi et al. | 370/366 |

* cited by examiner

Primary Examiner—Alpus H. Hsu
Assistant Examiner—Thien Tran (74) Attorney, Agent, or Firm—Carlos Munoz-Bustamonte (57) ABSTRACT

A service message system for a switching architecture including at least one Switch Fabric (10, 20) comprising a switch core (15, 25) located in a centralized building and a set of Switch Core Access Layer (SCAL) elements distributed in different physical areas for the attachment to the different Port adapters (30, 31). Each SCAL elements particularly includes a SCAL receive element (**11-*i*) and a SCAL Xmit element (12-*i***) for the respective access to one input port and one output port via serial links. The service message is based on the use of a Cell qualifier field at the beginning of each cell, which comprises a first and a second field. The first field is the Filtering Control field which permits an easy decoding of a service message cell, when applicable. The second field is used for determining which particular type of service message is conveyed via the cell. Following the Cell qualifier is the Switch Routing Header (SRH) which permits the characterization of the destination of the cell and is used for controlling the routing process. Preferably, the service message is used in a fault tolerance configuration where two different Switch Fabrics act as a standby to each other and shares a part of the traffic. Each one is configured as a default routing path for some ports adapters and a backup path for the others. In that particular configuration, the service message system of the invention uses the first field of the Cell qualifier to transport a Direct filtering command causing the Switch fabric to route the cell when the SRH is representative of its default output port destination. Conversely, the first field may transport a Reverse filtering command in the first field that causes the Switch fabric to reverse the default routing process. The first field is also used for characterizing a service message cell which the second field indicates the accurate type. Particularly, two types are used for the production of the filling cells when no data cell is to be transmitted at a particular location of the switching architecture.

9 Claims, 4 Drawing Sheets

SERVICE MESSAGE SYSTEM FOR A SWITCHING ARCHITECTURE

TECHNICAL FIELD

The invention relates to the telecommunication field and, more particularly, to a service message system for a switching architecture that includes at least one Switch Fabric with a switch core located in a centralized building, and a set of SCAL elements distributed in different physical areas for the attachment to the different Port adapters.

BACKGROUND ART

Modern switching architectures tend to become more and more complex and fast. Complexity may be expressed in terms of number of individual switching modules and the number and speed of the Terminal Adapters that may be attached to the switching architecture. Different ways are provided for aggregating modern switching modules and expanding their performance for providing the high-speed switches that are required. The switches may be expanded in terms of the number of ports and the speed of a given technology. Shared buffer switches can be more enhanced by means of speed expansion and port expansion mechanisms, and even buffer expansion. Examples of such shared buffer techniques can be found in the non published As the degree of sophistication of the switching architecture increases, it is highly desirable to provide strong and efficient possibilities of testing, maintenance and fault tolerance capabilities at every particular location within the architecture, even when the latter expands over some hundreds of meters. Therefore, it is very important that the switching architecture is fitted with some appropriate and effective service message capabilities. The service message should permit an effective possibility of control message transmission so as to permit a safe switch-over of some components when this appears necessary, particularly when a maintenance operation is planned. Additionally, the service message channel should enhance the possibilities of testing the different parts of the system, particularly when the latter is very large and complex because of the use of a port expansion architecture.

SUMMARY OF THE INVENTION

It is an object of the present invention to provide a simple and efficient service message channel that is adapted to the topography of the modern switching architectures, comprising numerous different components.

It is a further object of the present invention to provide a service message that suits the needs of breakdown detection that is required in the large switching architectures based on port expansion.

It is another object of the present invention to provide a service message capability that permits an easy switch-over process between two particular Switch Fabrics that are mounted in a fault tolerance arrangement.

These and other objects of the present invention are achieved by the service message system for a switching architecture that is defined in the set of claims. Basically, the switching architecture includes at least one Switch Fabric comprising a switch core located in a centralized building and a set of Switch Core Access Layer (SCAL) elements distributed in different physical areas for the attachment to the different Port adapters. Each SCAL element particularly includes a SCAL receive element and a SCAL Xmit element for the respective access to one input port and one output port via serial links. The service message is based on the use of a Cell qualifier field at the beginning of each cell, which comprises a first and a second field. The first field is the Filtering Control field which permits an easy decoding of a service message cell, when applicable. The second field is used for determining which particular type of service message is conveyed via the cell. Following the Cell qualifier is the Switch Routing Header (SRH) which permits the characterization of the destination of the cell and is used for controlling the routing process.

Preferably, the service message is used in a fault tolerance configuration where two different Switch Fabrics act as a standby to each other and share a part of the traffic: each one is configured as a default routing path for some port adapters and a backup path for the others. In that particular configuration, the service message of the invention uses the first field of the Cell qualifier to transport a Direct filtering command causing the Switch fabric to route the cell when the SRH is representative of its default output port destination. Conversely, the first field may transport a Reverse filtering command in the first field that causes the Switch fabric to reverse the default routing process. The first field is also used for characterizing a service message cell which the second field indicates the accurate type. Particularly, two types are used for the production of the filling cells when no data cell is to be transmitted at a particular location of the switching architecture.

Preferably, in response to a detection of an error condition or a switch-over request for maintenance purpose, each SCAL Receive element generates filling cells of said second type instead of the filling cells of said first type when this is necessary, i.e., when no data cells are to be transported. Similarly, each switch core starts producing filling cells of the second type in lieu of filling cells of the first type when all the input ports receive filling cells of the second type. This permits propagation on the switch core the limit of flow of data cells. When each SCAL Xmit element receives the filling cell of the second type, it can uses the latter as an indication that a safe switch-over can be achieved, without loss of cell, disordering of sequence, etc.

In a preferred embodiment of the invention, the service message is used in association with the port expansion architecture. In that situation, several switch cores are mounted in a port expansion configuration via corresponding Fan-out and Fan-in circuits. Each SCAL Receive element regularly uses the service message channel for producing cells of a third type which are received by the corresponding switch core attached at the opposite end of the serial link (of several hundreds of meters) for performing a test continuity and analysis of the input segment of the port expansion architecture comprising the fan-out circuit. More preferably, the detection is made by means of hardware circuits, thus requiring no huge amount of processing resources and the result of the detection is reported into a 16-bit register that the processor inside the core may access to get a precise status of all the input ports.

Similarly, the Switch cores regularly produce service message cells having a still different type than the preceding ones, and which are received by the corresponding SCAL Xmit element in order to test the output segment of the port expansion architecture comprising the fan-in circuit. In a preferred embodiment of the invention, the port expansion factor is fixed to 2 and the number of fan-in circuits is two. Therefore, each branch located upstream the fan-in circuit is assigned an unique type of service message cell, which permits very accurate and effective breakdown detection.

DETAILED DESCRIPTION OF THE PREFERRED EMBODIMENT OF THE INVENTION

Figure 1:
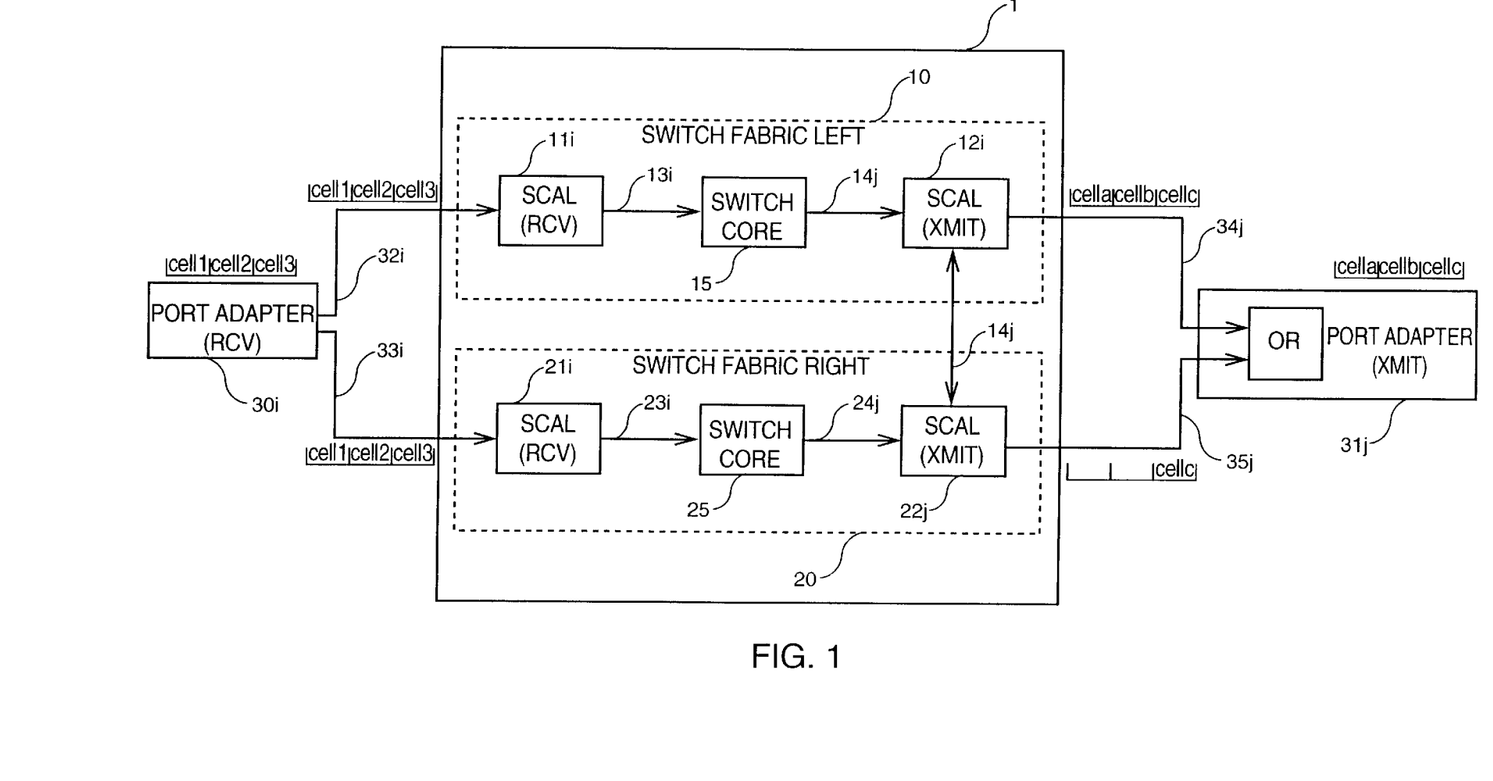
FIG. 1 illustrates the fault tolerance switching architecture in accordance with the present invention.

FIG. 1 illustrates the basic switching architecture for embodying the present invention. The architecture is based on a set of two individual and identical switch Fabrics 10 and 20. Switch Fabric 10 includes a switch core 15 located in a centralized area (generally a centralized building) and a set of Switch Core Access Layers (SCAL) elements 11 and 12 which are located at different points in accordance with the particular location of the telecommunication lines. Similarly, Switch Fabric 20 includes a switch core 25 attached to a set of SCAL elements 21 and 22 providing the attachments to the telecommunication adapters. FIG. 1 shows the switching architecture with respect to one port while, in reality, a numerous set of ports are involved, generally at least 16 ports. In the example, the receive side of the Switch Fabric is referenced with respect to the port i, and, consequently, the SCAL receive element is referenced 11-$i$ (resp. 21-$i$) which corresponds to the input port i, attached to the port adapter 30-$i$. FIG. 1 shows the architecture with respect to a output port j, and, consequently, SCAL Xmit element 12-$j$ (resp. 22-$j$) corresponds to the output port j attached to the port adapter 31-$j$. From a functional point of view, a Port Adapter Receive 30-$i$ produces a sequence of cells which are simultaneously transmitted to the corresponding SCAL receive element 11-$i$ in the Switch Fabric 10 through the link 32-$i$, and to the SCAL receive 21-$i$ in the Switch Fabric 20 through the link 33-$i$. Generally speaking, each SCAL receive element 11-$i$ and 21-$i$ are connected to their corresponding switch core via a set of n serial links 13-$i$ and 23-$i$ permitting the communication between the different buildings wherein the switching structure is located. Similarly, the two Switch Cores 15 and 25 are respectively connected to their corresponding SCAL transmit part 12-$j$ and 22-$j$, via a set of n serial links 14-$j$ and 24-$j$. The cells which are produced by the two SCAL Xmit elements 12-$j$ and 22-$j$ are respectively transported through the links 34-$j$ and 35-$j$ to the Port Adapter (Xmit) 31-$j$.

Figure 2:
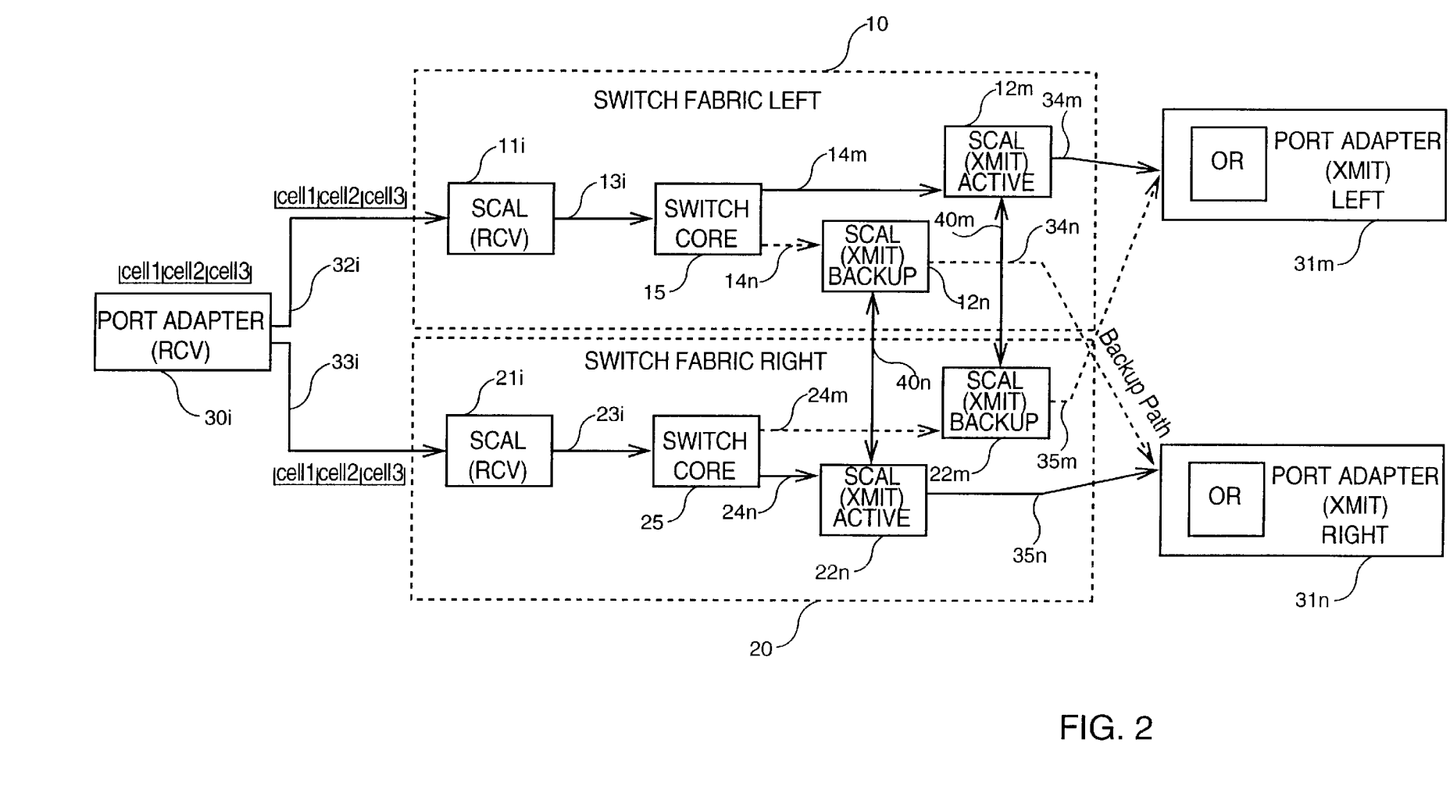
FIG. 2 shows the principle of the load-sharing of the traffic between the two fault-tolerant switch cores.

With the invention, the Switch Fabrics 10 and 20 are mounted in a fault tolerance configuration, allowing each one of the Switch Fabrics to replace the other in case of breakdown. In normal conditions, the redundant Switch Fabrics 10 and 20 operate in a load sharing way and each one handles a part of the load (backup/active). The invention incorporates a special mechanism that permits the use of normal Port Adapters (Xmit) designed to receive the nominal data rate instead of twice the nominal flow coming from the two Switch Fabrics. FIG. 2 shows more particularly the arrangement of the mechanism permitting the two Switch Fabrics 10 and 20 to operate as a standby active to each other. Basically, the load sharing of the traffic between the two switch Fabrics 10 and 20 is achieved by means of a predetermined distribution of the output ports to either Switch Subsystem 1 or Switch Subsystem 2. A so-called group LEFT comprises the Xmit adapters that are assigned to Switch Fabric 10 and receives the normal traffic of cells via that Switch Fabric. Conversely, a RIGHT group comprises the other Xmit adapters that are affected to Switch Fabric 20 for receiving the data cell from the latter in normal conditions.

More particularly, with respect to FIG. 2 again, a Port Adapter Xmit 31($m$) is assigned to the so-called Left group while the Right group includes Port Adapter Xmit 31($n$). Additionally, each Switch Fabric path, e.g., Switch Fabric 10, comprises SCAL Xmit elements that are divided into two groups—so called ACTIVE and BACKUP—corresponding to the repartition previously made of the PORT ADAPTER Xmit elements. FIG. 2 shows that Port Adapter Xmit 31($m$) belonging to the LEFT group (assigned to the left switch path) is physically connected to a corresponding SCAL Xmit element 12($m$) that belongs to the ACTIVE group of the Switch Fabric 10. Port Adapter Xmit 31($m$) is also physically connected to SCAL Xmit element 22($m$) which belongs to the BACKUP group of the Switch Fabric 20.

Similarly, the Port Adapter Xmit 31($n$) that belongs to the RIGHT group assigned to the right switch path is physically connected to a corresponding SCAL Xmit element 22($n$) belonging to the ACTIVE group of Switch Fabric 20 and is further physically connected to SCAL Xmit element 12($n$) belonging to the Backup group of Switch Fabric 10.

During normal conditions, the load sharing of the traffic between the two traffic paths is achieved as follows. Port Adapter 30($i$) for instance generates a cell which comprises a cell qualifier, a Switch Routing Header (SRH) and a payload. The SRH includes a two-bytes routing label which characterizes the destination of the cell, that is to say the Port Adapter Xmit to which the cell will be delivered in case of an unicast connection, or the different Port Adapter Xmit elements in case of multicast connection. In addition to the SRH, the Cell qualifier is basically used for fault tolerance control purpose. The cell is then simultaneously transmitted to both SCAL Receive elements 11($i$) and 21($i$) which are locally attached to the Port Adapter. Both SCAL Receive elements expand the SRH field by introducing an additional two-bytes reservation which will be affected to the location of the particular bitmap value that will be used inside the switch cores 15 and 25 for controlling the internal routing process. The cell can then be remotely transported to the centralized Switch cores 15 and 25 via a set of serial communication links 13($i$) and 23($i$). Serial communication links 13($i$) and 23($i$) particularly achieves the long distance connection, up to several hundred meters, between the centralized Switch cores 15 and 25 and the distributed Port Adapters attached to the telecommunication lines. Hence, the same cell arrives at the input of both Switch core 15 and switch core 25. Each of the latter includes a Routing Control Device that uses the SRH value for deriving a bitmap value that is introduced in the additional two bytes that were introduced at the level of the SCAL Receive element 11($i$) and 21($i$).

The processing of the same cell being received at the input of the two Switch cores strongly differs because of a masking mechanism that achieves the load-sharing of the traffic between the two Switch Fabrics 10 and 20. Such a masking mechanism is particularly described in European patent application no. 98480039.1 that is assigned to the Assignee of the present application and which is herein incorporated by simple reference. Basically, each Switch core 15 or 25 comprises an internal masking system that receives the bit map retrieved by the Control Routing Device at the input of the switch core, and which derives a residual bit map which is used for controlling the internal routing process within the core.

Generally speaking, the two masking mechanisms of Switch core 15 and 25 operate with complementary mask values so that one cell which is duplicated at the input of the two cores can only be transmitted to one output port of one Switch core.

The mask mechanisms are, however, controllable by means of the value loaded in the Filtering Control field (FCF) contained into the Cell qualifier. Therefore, the Cell qualifier can be used to control the normal load balancing mechanism between the two Switch Fabrics and to permit some cells, containing a Filtering Control field characteristics of a Reverse filtering command, to transport the cell towards their appropriate Port Adapter Xmit elements via the backup path instead of the direct path. A control bus 40(*m*) (resp. 40(*n*)) is used for performing the arbitration between the two associated Active and Backup SCAL Xmit elements 12(*m*) and 22(*m*) (resp. 12(*n*) and 22(*n*)) so as to prevent a simultaneous presentation of two cells to a same Port Adapter Xmit. Conversely, when the Filtering Control field of the Cell qualifier characterizes a so-called Direct filtering command, the bit map is not affected by the masking mechanism and the cell is routed via the switching architecture via the normal direct path. This is simply achieved by the control of the masking mechanism by means of the value of the Filtering Control field. This permits some cells to be used as testing cell to regularly check the backup path. Additionally, the masking mechanism can be controlled by the processor located inside the switch core so as to modify the repartition of the active elements and permits a maintenance operation to be performed, for instance the replacement of a SCAL Xmit active element.

The invention strongly enhances the use of the masking mechanism of the switching architectures by introducing new and multiple service message capabilities in order to achieve powerful message capabilities enhancing fault tolerance and load-balancing control. In addition to the Filtering Control field, the Cell qualifier is assigned the role of providing enhanced and powerful service messages which are decoded by hardware circuits in the different locations of the switching architecture. As described below, there is provided a very effective service message capability for permitting fault tolerance and load-balancing control.

With the teaching of the invention, the first two bits of the Cell qualifier are assigned the role of the Filtering Control Field for controlling the filtering mechanism in association with the mask mechanism as described above, while the six other bits are affected to the purpose of the message service. More particularly, when the first two bits carry a Direct filtering command (e.g. b'01'), the masking mechanism is disabled and the residual bit map is identical to the bit map value produced by the Routing Control tables at the input of the switch core processing the cell. Conversely, when the first two bits carry a reverse filtering command (e.g. b'10'), the masking mechanism is enabled, thus deriving from the bit map a residual bit map for the purpose of controlling the routing mechanism in such a manner that the cell is output through the Backup path (SCAL Xmit Backup elements 12-*n* or 22-*m*).

But, the first two-bits of the Cell qualifier may also carry a value characteristic of a service message cell (e.g. b'00'), the contents of which are defined by the six bits that follow in the Cell qualifier. This is an important characteristic of the present invention in which the cell which is conveyed throughout the switching architecture like any current cell, is assigned very specific functions for testing and maintenance purpose. More particularly, the service message cell is transported throughout some elementary segments in the switching architecture and is subject to a particular processing in the considered segment.

Figure 3:
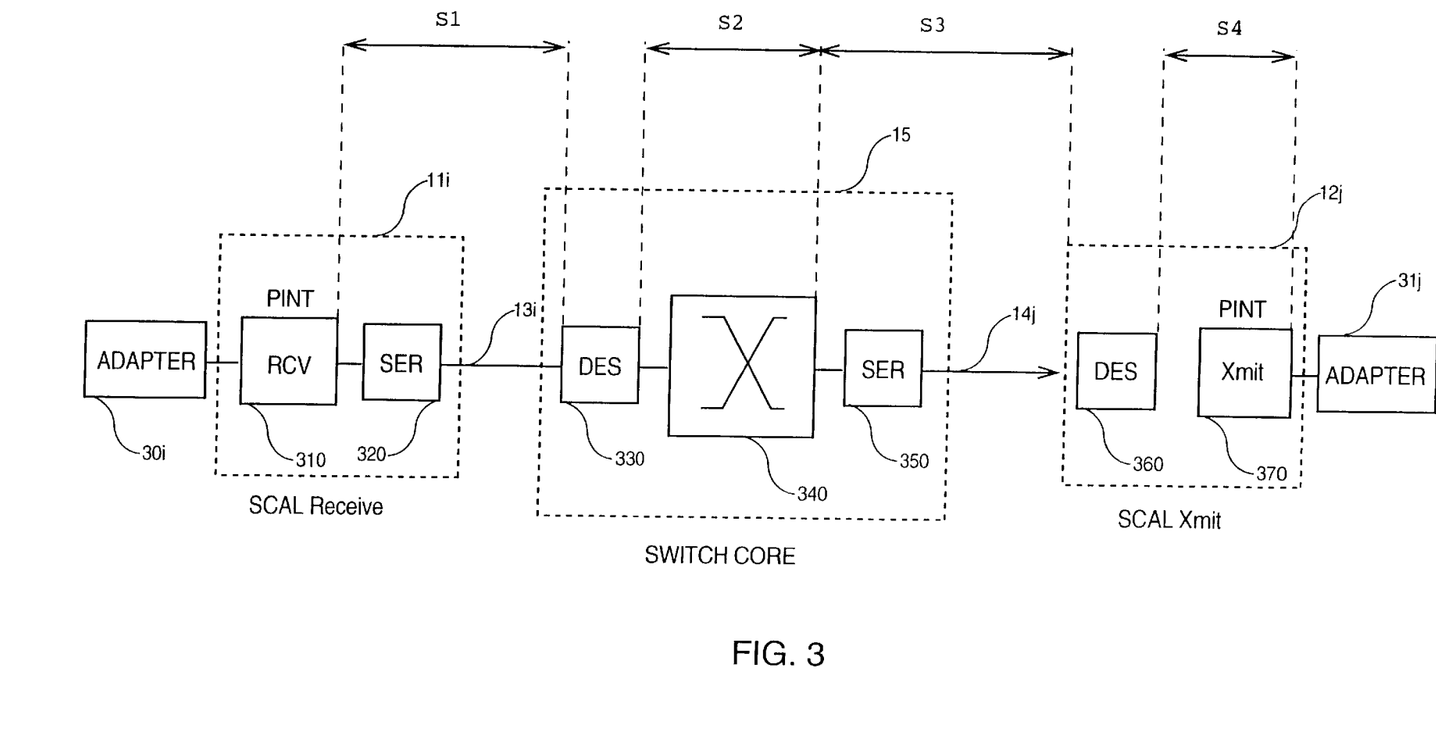
FIG. 3 illustrates the different segments involved in the processing of the service messages of the present invention.

FIG. 3 develops the switching architecture and, more particularly, the internal constitution of the Switch Core, the SCAL Receive and the SCAL Xmit element (only the ACTIVE one being represented for clarity's sake). As explained in European patent applications numbers 97480057.5, 97480056.7, 97480065.8, 96480129.4, 96480120.3 assigned to the Assignee of the present application, SCAL Receive element 11-*i* comprises at least a Protocol Interface (PINT) Receive element 310 including queuing resources for the temporary location of the cells being transmitted to the Switch core 15 and for performing a two-byte reservation within the cell for the purpose of the routing control process of the latter within the switch core. In the preferred embodiment of the invention, one individual PINT component is provided to slice the cells in four logical units which will be serially transported through link 13-*i*. SCAL Receive element 11-*i* further includes at least one set of four serializers associated to the PINT circuit for performing serialization of the logical units to prepare their transmission through the link. Similarly as above, the preferred embodiment of the invention uses one set of four serializers so that the cells are transported to the appropriate input port of the switch by means of four high-speed serial links. The one set of four Serializer 320 incorporates a 8B/10B coding process in the serialization of the logical units for enhancing the corruption detection. In the preferred embodiment of the invention, the four logical units of a cell are transported in parallel via four serial links that is represented by serial link 13-*i* in the figure. Serial link 13-*i* achieves the transport of the cell, or the four logical units, towards a distance of more than 100 meters separating the location of the telecommunication lines (i.e. the SCAL elements) and the centralized switch core.

Switch core 15 includes at least one set of four deserializing component 330 that performs the deserialization of the logical units so that the cell can be transported to a switching structure 340 forming the heart of the switch core 15. Similarly as above, the preferred embodiment of the invention uses a set of four distinctive deserializers that each handles a particular one among the four LUs that constitute the cell being routed. In the preferred embodiment of the invention, even the switching structure 340 is based on four individual modules (only one of which is shown) that can thus directly route the different logical units towards the appropriate output port direction. Such arrangement of four distinctive Logical units is not part of this invention and will not be elaborated more precisely. However, more details can be found in the above mentioned patent applications. It should be noticed however that the invention could be used without using different separate logical units and with a switching structure that only uses one individual switching module.

With respect to the output port direction of the Switch core 15, at least one set of four serializing component 350 is arranged for performing the serialization of the cell arranged in four logical units in the preferred embodiment of the invention. As for the set of four serializer 350 mentioned above, an 8B/10B coding is introduced for enhancing the corruption detection while the cells are transported up via serial link 14-*j* (comprising four serial links in the preferred embodiment) to the SCAL Xmit element 12-*j*.

SCAL Xmit element 12-*j* comprises at least one set of four deserializer 360 for receiving each logical unit transported via link 14-*j*. A corresponding PINT circuit 370 receives the logical units and particularly extracts the bit map reservation field that was previously introduced by PINT circuits of the SCAL receive part before the cell was routed. The cell can then be provided to Adapter 31-*j* for the purpose of the transmission to the appropriate telecommunication line.

In the present invention, some service message cells characterized by the two first bits of the Cell qualifier equal to b'00' can be generated at different locations within the switching architecture, and subject to a particular processing. This is used for the proper testing of different segments of the architecture, and additionally for performing an efficient service message cell distribution enhancing the fault tolerance and maintenance capability of the switch Fabrics.

A first segment Si in FIG. 3 is defined as comprising the output of PINT Receive circuit 310 downstream its internal queuing resources, serializer 320, link 13-*i*, and the input part of deserializer 330 that is upstream the internal queuing resources therein located.

A second segment S2 is defined as comprising the output part of deserializer downstream the queuing resources of the latter, the input part of the switching structure located upstream its internal queuing resources.

A third segment S3 is defined as comprising the output circuits of switching structure 340, downstream its internal queuing resources, serializer 350, serial link 14-*j*, and the input circuit of deserializer 360 that are located upstream its internal queuing resources.

At last, a fourth segment S4 is provided that comprises the output circuits of deserializer 360, being located downstream its internal queuing resources, plus the input part of PINT 370 which is located upstream its internal queuing resources.

In the invention, service messages taking the form of normal cells are generated at the beginning of each segment and are processed when they arrive at the end of the considered segment. This achieves the possibility of a very simple switch-over mechanism of one switch Fabrics to the other without any loss of cells. Let us assume, for instance, that a maintenance operation, such as a card replacement or a system upgrade in one of the two Switch Fabric, either Left or Right, is planned. This operation should be achieved without any loss of cells, erroneous duplication of cells, disordering of cells and excessive cell delay variation. Assuming that the objective of the operation is to withdraw the Active SCAL Xmit element 12-*m* of FIG. 2 which is located in the Left Switch Fabric 10 and to replace it by its associated backup element 22-*m*. From this instant, the production of the test cells carrying the reverse control field for regularly checking the backup path is stopped. After a predetermined period sufficient to ensure that the last test cell is propagated through the switching architecture, the maintenance process starts with the transmission of a Left Switch Over Request (L_SOV_R) signal to all the components of the architecture. Generally speaking, the elements of the architecture that are located on a same physical entity simultaneously receive that signal. Conversely, the elements that are remotely located to each other receive the signal at different times. As explained in the co-pending patent application, the replacement of the particular SCAL Xmit element 12-*m* involves three different phases: a merging of the traffic so that it exclusively flows in the second Switch Fabric; the replacement of the SCAL Xmit element by a new card; the load balancing of the traffic via the two switch fabrics again.

In a first phase, all the traffic which is normally flowing via the two switch Fabrics is merged through Fabric 20 which is not involved by the maintenance operation that is planned. This involves some processes to be respectively performed by SCAL Xmit element 12-*m* and SCAL Receive element 11-*i*.

When SCAL Xmit element 12-*m* receives the Left Switch-over Request (L_SOV_R) signal, the latter locks control bus 40-*m* in order to correspondingly lock the output of its associated Backup SCAL Xmit element 22-*m*.

The process performed by SCAL Receive element in response to the detection of the L_SOV_R signal directly affects the production of the filling cells that are normally produced in the absence of any data cells. Indeed, when filling cells are to be generated, SCAL Receive element 11-*i* generates service message cells that are characterized by the Filtering Control field that is dedicated to the service message, that is to say b'00' in our example. As long as SCAL Receive element 11-*i* does not receive the L_SOV_R signal, the service message cells conforms to a first type characterized by a first value of the six remaining bits within the Cell qualifier. However, as soon as SCAL Receive element detects the L_SOV_R signal, the filling cells that are produced conform to a second type. They still are service message cells because they have the Filtering Control Field that is dedicated to the service message, that is to say b'00'. However, the six remaining bits within the Cell qualifier now present a second value characteristic of that second type of service message cells.

Those service message cells of a second type are then propagated via serial link 13-*i* and the deserializer 330 that is located in switch core 15 at the opposite side of segment 1. Deserializer 330 is now aware of the production of filling cells of type 2.

From that instant, when deserializer 330 needs to generate filling cells, due to a lack of cells within its internal queuing resources, it initiates the production of filling cells of the second type whereas, previously it produced filling cells of the first type. Those new filling cells are then received at the opposite end of segment 2, that is to say by the switching structure 340.

From the detection of a first filling cell of the second type on one input port, Switching structure starts a loop detection process in order to determine the accurate instant when such a type_2 filling cell is detected on each input port. When this occurs, due to the propagation of the last data cells transmitted through Switch core 15, the switching structure generates a beginning of segment 3 a sequence of type-2 filling cells. Those are then propagated towards segment 3 up to the opposite end which is into deserializer 360.

Deserializer 360 generates filling cells of the first type when it is necessary, that is to say when its queuing resources become empty. However, as soon as the latter receives a filling cell of the second type it also starts generating the same type of filling cells when this appears necessary. The latter are then transported via segment 4 up to the PINT element which is then made aware that all the data cells that have been transmitted via the Switch Fabric 10 have been conveyed to the adapter and that now the Left Fabric path can be released. The switch over of Left Fabric can then be performed without any loss of cells. The SCAL Xmit element 12-*m* can then switch back to a state wherein it will acknowledge the requests of the associated backup SCAL Xmit element 22-*m*. This obviously results in the unlocking of the previously locked output of SCAL Xmit backup 22-*m*, but has the strong advantage of preventing any disordering. This is also reported to the internal control processor located into the SCAL active Xmit element. The latter processor is then made aware that the processing of the second phase can be initiated without any loss of data.

A second phase being involved for the SCAL Xmit element 12-*m* consists in the new configuration installation where the entire traffic of data can be switched on the unique switch Fabric that will remain active. This is performed in accordance with the above mentioned co-pending patent application description (no. 98480039.1). Basically, this is performed after having checked that each component has received the filling cells of the second type and, thereafter, it becomes possible to perform any maintenance operation on the switch fabric left since all the traffic is routed through the right side. In particular, the SCAL Xmit element 12-*m* may be unplugged and replaced by another one.

In a third phase, when the maintenance operation is completed, the traffic can be switched back to the original configuration wherein each Switch Fabric receives a part of the total traffic. The third phase is triggered by the deactivation of the L_SOV_R signal.

Upon detection of the latter event, SCAL Xmit element 22-*m* causes the locking of the SCAL Xmit active element 12-*m* via bus 40-*m*. Upon detection of that same event, SCAL Receive element 11-*i* and 21-*i* returns back to the production of the normal filling (type-1) cells when necessary. Similarly, switch cores 15 and 25, upon detection of the deactivation of L_SOV_R signal on each one of the sixteen input ports, also produce again normal filling type-1 cells instead of the service message cells of the second type, when necessary.

When SCAL Xmit Backup element 22-*m* detects the arrival of the first normal filling cell or the cell with Direct filtering Command in the Filtering Control field, and when, additionally, no cell to be transmitted remains in its queuing buffer, the latter removes the lock command to the SCAL Xmit element Active 12-*m* from the bus 40-*m*. This detection is reported to the internal control processor which is located in the Backup SCAL Xmit element 22-*m* to inform the latter that, at that level, the third phase is being completed as soon as Active SCAL Xmit element 12-*m* has checked that it has been unlocked by the SCAL Xmit backup 22-*m*.

It, therefore, appears that the invention takes an advantageous use of the first byte of the cells. The Filtering Control field, i.e. the two first bits are used for either decoding a no_filtering control command (e.g. b'11'), a direct filtering command (b '01') or a reverse filtering command (b'10') or still a service message cell. In the case of a service message, cell the six bits in the remaining part of the Cell qualifier are used for performing the switch-over mechanism between the two switch fabrics in a very simple way.

Additionally, as it appears below, the cell qualifier is used for achieving high performance when the architecture is based on port expansion.

Figure 4:
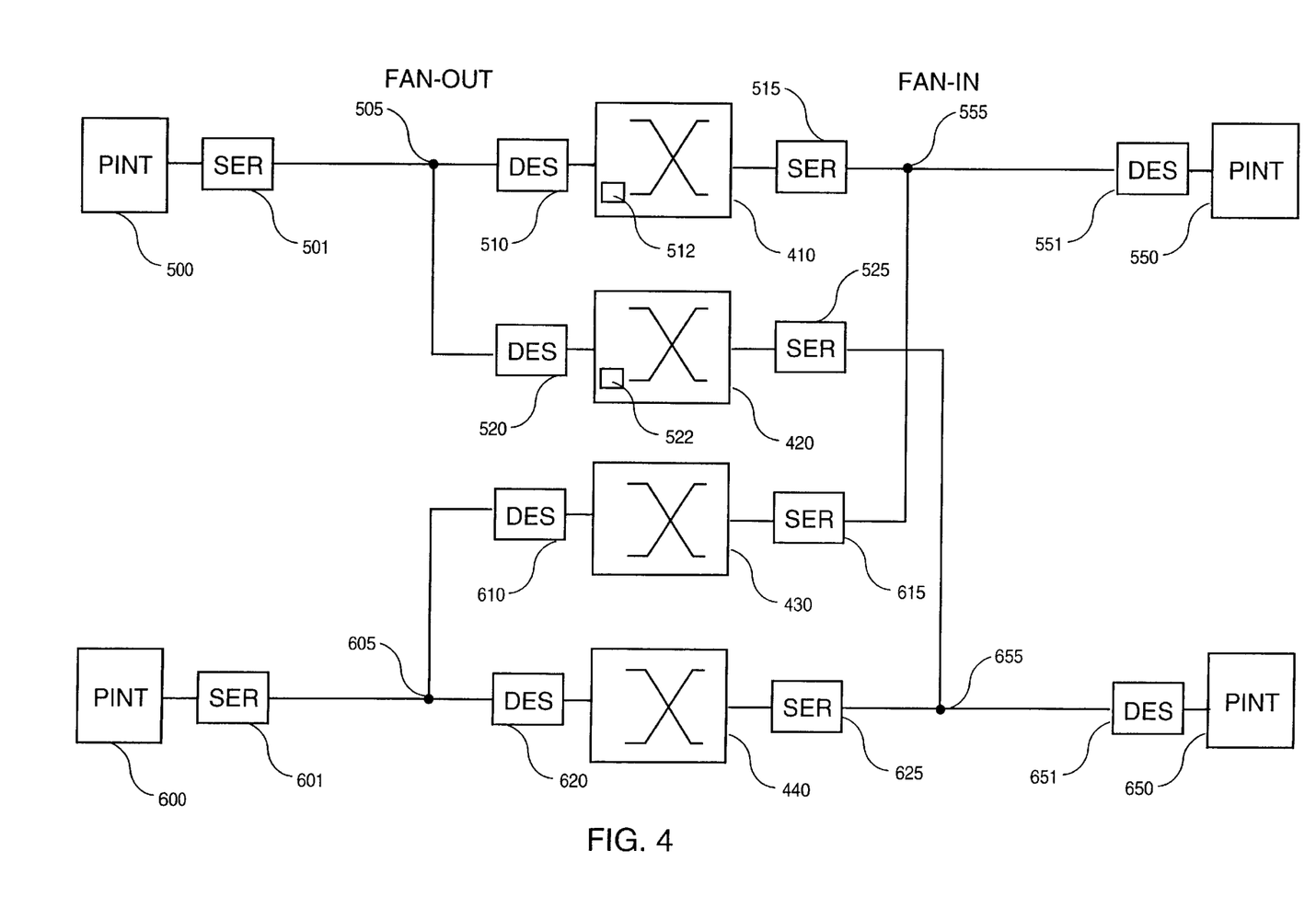
FIG. 4 illustrates the use of the enhanced service message cells in a port expansion structure.

FIG. 4 illustrates the use of the enhanced service message cells in a port expansion structure. A port expansion structure permits increase by a factor of two, or more the number of ports which can be attached to a given switch core. The figure illustrates a port expansion architecture of four individual switch cores 410, 420, 430 and 440 for the purpose of a port expansion factor of 2. Therefore, a PINT 500, associated to a serializer 501 constitutes a first SCAL Receive part which can be respectively attached to switch core 410 and 420. That attachment is, as described above, achieved by means of a Fan-out (FO) circuit 505 and the associated deserializers 510 and 520, respectively. Additionally, a second PINT 600 that is associated to a Serializer circuit 601 constitutes another SCAL Receive element that respectively gets an access to one input port of a switch core 430 and one input of a switch core 440. This is also achieved by means of a Fan-out circuit 605 and the set of deserializer 610 and 620 for respectively reconstructing the logical units transported via the medium, either optical or wired.

With respect to the output side of the switch cores, the port expansion architecture permits a first SCAL Xmit element, including deserialiser 551 and PINT Xmit 550, to be respectively attached to one output port of switch core 410 via serializer 515 (and the not shown transmission medium) and one output port of switch core 430 via serializer 615 (and the not shown transmission medium). That attachment is achieved by means of an appropriate Fan-in circuit 555. Similarly, a second SCAL Xmit element, comprising a Deserializer 651 and a PINT 650, respectively, gets an access to one output port of switch core 420 via serializer 525, and one output port of switch core 440 via serializer 625. That is achieved by means of a Fan-in circuit 655 that is similar to Fan-in circuit 555.

The invention uses the service message cells characterized by the Filtering Control field equal to b'00' in the preferred embodiment for performing specific error detection and testing functions that are very useful in the port expansion architectures. For each considered port of a switch core, this is achieved by means of a specific processing that occurs in two particular segments, an input and an output segment.

The input segment of the port expansion architecture is a point to multipoint segment that achieves the required fan-out for the port expansion architecture. This segment includes the output of the PINT 500, downstream its internal queuing resources, the serializer 501, the transmission medium, be it either optical or wired, the fan-out circuit 505 and, for each switch core 410 or 420, the corresponding deserializer 510 or 520, and an internal detection system located in each switch core. Hence, switch core 410 includes a detector 512 and switch core 420 incorporates a detector 522. On this particular segment, a service message cell, so called Fan-out test service cell (FOT), is generated by the processor located into the PINT element 500. The Fan-out test service cell presents a Cell qualifier having a Filtering Control field that is of the service message, that is to say b'00' in the preferred embodiment. However, the six bits that remain in the Cell qualifier are fixed to a third value that is different from the first and second values that were mentioned above.

With the present invention, the Fan-out test service cell is associated with the following processing. Each processor located within a PINT Receive element; e.g., PINT 500—generates a Fan-out test service cell as defined above at regular intervals, for instance every 10 milliseconds. The detection circuits 512 and 522 which are respectively located into switch cores 410 and 420 (and also in the other cores of the port expansion architecture) are specific hardware mechanisms which are designed to perform a test on the first byte of every cell. This is very simple because they only require the testing of the Filtering Control field (2 bits) and the remaining 6 bits of the Cell qualifier. There is no need to process additional bytes and the detection of a Fan-out test service cell is made very easy. The particular detection of the Fan-out test service cell for a given input port is then reported in a corresponding bit of a sixteen bit register that collects the result of the different detection processes for every input of the core. The processor that is included into the switch core (and which is not shown in the figure) can then very easily address that register to immediately be informed of the status of every input port. The reading process can occur at regular intervals, e.g., every 15 milliseconds and, therefore, each switch core can be informed of the status of the continuity of the input segment of the port expansion architecture. Additionally, in a preferred embodiment of the invention, an error isolation software program is used for the purpose of analyzing the contents of the register of each switch cores 410–440 so as to provide a comprehensive and very useful status of the different communication segments of the cores. In a preferred embodiment of the invention, the Fan-out test service cells are associated with the use of a redundant 8B/10B coding process on the different links that separate the SCAL elements from the centralized switch cores. The information that is provided from the use of the 8B/10B coding, with that contained into the above mentioned process, can be used to derive an accurate location of the occurrence of error conditions or failures. For instance, if the two registers contained into cores 410 and 420 reveal the existence of an error, this most likely comes from a failure occurring at the source of the cells, i.e., the PINT or still the serializer 501. On the other hand, the 8B/10B coding process permits the detection of errors occurring into the serializer 501, which eventually leads to the determination of which of the components, the PINT 500 or the serializer 501 is subject of a breakdown. If only one of the two registers within switch cores 410 and 420 reveals an error, that means that only the downstream part of the fan-out circuit is subject to a breakdown.

Very easy error detection upstream the switch core is thus allowed. However, the service message cells that are provided by the present invention even permit the detection of errors occurring downstream the switch cores in the output segment, that is to say with respect to the fan-in circuit. This is achieved by the use of a new service message cell, known as a Fan-in test service cell. The latter is a service message cell, having a filtering control field equal to b'00' as any other service message cell. However, the six remaining bits of the Cell qualifier carry a value that is assigned to a fourth value being different from the three first values mentioned above. The Fan-in test service cell is used for testing purpose of the output segment of the port expansion architecture. That output segment comprises for each switch core 410 or 430 the output circuit of the switch core that is located downstream its internal queuing resources, the serializer 515 or 615, the serial link up to the fan-in circuit 555. Downstream the fan-in-circuit 555, the output segment comprises the serial link or links that go up to the deserializer 551, and a hardware detection circuit that is located within PINT 550. For every output segment, the processor that is located within each switch core regularly produces broadcast Fan-in test service cell which will be decoded by the detection circuit located into PINT 550. In the preferred embodiment of the invention, the testing mechanism is even enhanced by the use of two different Fan-in test service cells. Those distinguish by means of the six bits located in the Cell qualifier and which are also different from the above mentioned particular service message cells. The use of two different Fan-in test service cells, each corresponding to a particular sector of the fan-in path, and which is decoded by detection circuit into PINT 550 permits one to easily know which element of the output segment is subject to a breakdown. This is a very important result because fault tolerance is a key aspect in huge switch architectures such as port expansion. In the preferred embodiment of the invention, based on 16-ports switch cores, with a port expansion factor fixed to two, a test of 32 input segments and 32 output segments can be precisely done. When the port expansion factor reaches the value of 4, the number of input segments is 64. This emphasizes the interest of providing accurate testing process and powerful service messages for that purpose as does the invention.

Detection circuit that is provided into PINT Xmit 550 is able to detect which particular Fan-in test service cell has been received. This detection is reported in a particular bit of an appropriate Fan-in test register. Therefore, the processor that is located within PINT 550 is made aware of the precise status and continuity of the fan-in path, at each of its different leaves. When the port expansion factor is fixed to two, only a two-bit register is required. With a factor or four, a 4-bits register appears useful.

Similarly as above, the detection mechanism can be coupled with a fault isolation analysis program that centralizes the different information provided by the different detectors, in addition to the detection based on the redundant 8B/10B coding, in order to prepare a comprehensive report of the fault tolerance status.

Therefore, it appears that the Fan-out test service cell, which is very easily decoded by simple hardware means without requiring a huge amount of processing resources, permits effective detection of errors that might occur in the fan-out circuits of large switching architecture that are mounted in port expansion. This very efficient detection system can be very advantageously associated with the fault tolerant architecture that is described in patent application no. 98480040.9 which permits easy switch-over operations in case of the occurrence of failure conditions. Indeed, this detection process of the fan-out circuit can be easily associated with the known checking circuits, based on a processing unit and associated with hardware components, in order to detect the occurrence of a misfunctioning or a breakdown.

For instance, the SCAL Receive element includes a processor having means for performing an auto diagnosis, for instance a background diagnosis. Additionally, the element may be fitted with some kind of watch dog restart mechanism which is used for generating a general reset of the processor if the latter happens to be in a hang-up situations, characteristic of a misfunctionning. Also, the processor is programmed to verify the status of the ASIC elements by checking that the hardware error detection mechanism is not triggered, and by testing any incoming bus. For instance, on serial link or bus **13-*i***, the preferred embodiment of the invention uses a redundant 8B/10B for performing the error determination.

While the invention has been described in terms of preferred embodiments, those skilled in the art will recognize that the invention can be practiced with modification within the spirit and scope of the appended claims.

Having thus described our invention, what we claim is as follows:

1. A Service message system for a switching architecture comprising:
   at least one Switch Fabric for routing cells comprising a switch core located in a centralized building and a set of Switch Core Access Layer (SCAL) elements distributed in different physical areas for the attachment to the different Port adapters, each of said SCAL elements further comprising a SCAL Receive element and a SCAL Xmit element for the respective access to one input port and one output port via serial links;

characterized in that each cell being transported includes:
- a Cell qualifier field comprising a first and a second field, said first field (Filtering Control field) being decoded in the system as characterizing a service message and said second field characterizing a particular type of service message cell which is transported through the network; and
- a Switch routing header following said Cell qualifier field characterizing the destination of the cell and used for routing control purpose;

wherein service messages can be transported, routed and easily decoded through the switching architecture; the service message system further comprising
 at least a first and a second Switch Fabrics being arranged in a fault tolerance configuration where each Switch Fabric receives all the cells to be routed and is configured as a default routing path for some port adapters and a backup path for the other adapters;
characterized in that each switch fabric comprises: a decoder which decodes
- (a) in said first field a Direct filtering command causing the Switch fabric to route the cell when the SRH is representative of its default output port destination;
- (b) in said first field a Reverse filtering command causing the Switch fabric to reverse the routing process of said direct filtering command;
- (c) in said first field a service message command; and
- (d) in said second field a first or a second type of service message which serve as filling cells that replace data cells.

2. The service message system as defined in claim 1 characterized in that each SCAL Receive element generates filling cells of said second type in lieu of filling cells of said first type when necessary in response to either the detection of an error condition or a switch-over for maintenance operation.

3. The service message system as defined in claim 2 wherein each switch core produces filling cells of the second type in lieu of filling cells of said first type in response to the detection of the filling-cells of the second type at every input port.

4. The service message system as defined in claim 3 wherein each SCAL Xmit element receives the filling cells of said second type and uses the latter for causing a safe switch-over of the switch fabric.

5. The service message system according to claim 4 characterized in that it includes several switch cores that are mounted in a port expansion configuration via corresponding Fan-out circuits (505, 605) and Fan-in circuits (555, 655), characterized in that each SCAL Receive element comprises means for regularly producing service message cells characterized by a second field of a third type which are received by the corresponding switch cores for performing a test analysis of the input segment of the port expansion architecture comprising the fan-out circuit.

6. The service message system according to claim 5 wherein each switch core comprises detection circuits assigned to each input port for performing the detection of the service message of said third type, said detection circuits reporting the result of said detection in a register which the internal processor of the switch core may access for analysis purpose.

7. The service message system according to claim 6 wherein each Switch core comprises means for regularly producing service message cells of a fourth type which is received by the attached SCAL Xmit element in order to test the output segment of the port expansion architecture that comprises the fan-in circuit (555, 655).

8. The service message system according to claim 7 wherein each branch of the output segment of the port expansion architecture is assigned a particularly type of service message cell whereby it is made possible to precisely detect the occurrence of an error in a particular branch of the fan-out segment.

9. The service message system according to claim 8 wherein the fan-in and fan-out segments are also tested by means of a 8B/10B coding process.

* * * * *